Sept. 8, 1959 J. S. BENTLEY 2,902,877
MECHANICAL REMOTE CONTROLS
Filed Feb. 21, 1958
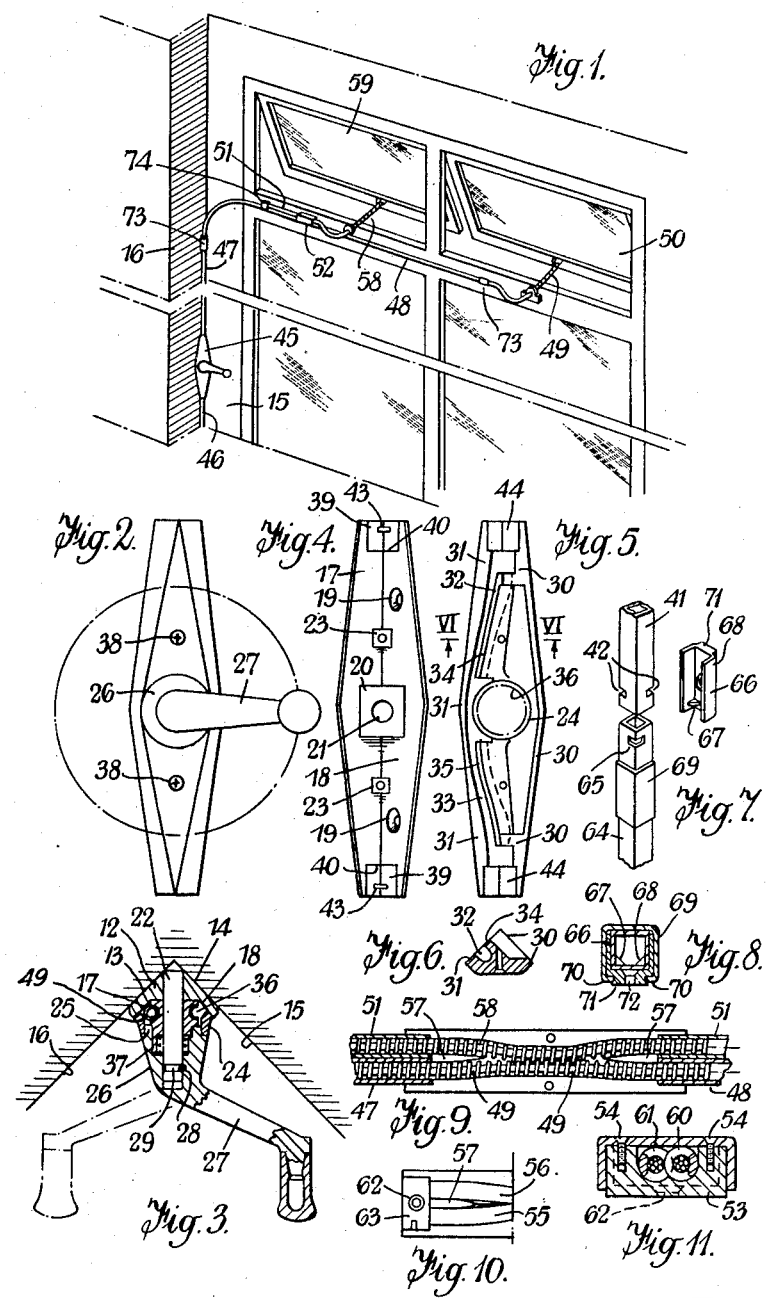
Inventor
James Sydney Bentley
By: Olson & Trexler attys United States Patent Office 2,902,877
Patented Sept. 8, 1959

2,902,877
MECHANICAL REMOTE CONTROLS

James Sydney Bentley, London, England, assignor to Teleflex Incorporated, Wilmington, Del., a company of Delaware Application February 21, 1958, Serial No. 716,788

Claims priority, application Great Britain February 28, 1957

8 Claims. (Cl. 74—422)

This invention relates to mechanical remote controls of the type comprising a guiding conduit in which a multi-stranded flexible cable having spaced helical projections on the exterior, is mounted to reciprocate, and has for its object to provide such devices having additional and greater advantages than those hitherto constructed.

Where it is advantageous or convenient for the guiding conduit to be laid at the angular intersection of two surfaces meeting in a dihedral angle, for example a "reveal" of a window, difficulties are met in fitting in this position a control of the type having a mechanical advantage and with adequate cable movement.

The present invention is concerned with a control fitting to overcome these disadvantages, in which a toothed wheel meshes with the cable and is turnable about an axis which more or less bisects the dihedral angle between the surfaces, permitting the mounting and manipulation of a crank handle of relatively large radius for action in the zone between the two said surfaces including the dihedral angle between them.

According to the main feature of the present invention the control fitting comprises an elongated casing of metal, plastic or other suitable hard material, made up from two parts herein termed the base and the cover.

The base has rear surfaces disposed at an angle the one to the other (equal to the dihedral angle into which the fitting is to be mounted) and these surfaces form the outer faces of two walls or thicknesses extending from end to end of the base and which on the interior have more or less a similar angular arrangement.

Mid-way between the two ends of the base on the interior, is formed a boss apertured for a fixed spindle and the outer flat surface of which comes in a plane parallel to what may be regarded as the longitudinal axis of the base and at a substantially equal angle to the planes of the rear surfaces of the base.

At each end of the base it is shaped to receive a portion of the end of the guiding conduit for the cable. These guiding conduits at the two ends of the base are in axial alignment and extend along the angular intersection between the dihedral surfaces.

The cover portion of the casing is co-extensive with the base and is shaped for its longitudinally extending edges to fit over or into the edges of the base. At its ends it is shaped in a manner similar to the ends of the base, also to receive a portion of the end of a guiding conduit. When the parts are assembled, the ends of the said conduits are securely held between the base and cover, by suitable means. For example, the base or cover may have a projection or key which fits into a notch in the conduit end before the cover is attached in position, to hold the parts assembled.

The cover also has curved guide channels for the cable so that as it passes out from one conduit at one end of the fitting it is (a) curved away from the rectilinear axis of the conduit; this is followed by a curvature (b) in the reverse direction and finally a curve (c) reverse to (b) to bring the axis into alignment with the rectilinear axis of the other aligned guiding conduit at the other end of the fitting. The arrangement is such that the intermediate curved portion (b) is disposed on the surface of the apertured boss of the base and to one side thereof.

In the intermediate position of its length the cover has an outwardly extending bored boss in axial alignment with the apertured boss of the base, and on the interior the bore of this boss opens into a recess to accommodate a gear wheel on the spindle and with which the curved portion (b) of the cable which is located in this position, is held in driven engagement.

The cover is secured to the base in any suitable manner, for instance by screw means.

The spindle, whose axis more or less bisects the dihedral angle between the surfaces carrying the fitting, is fixed in the apertured boss of the base and projects through the bore of the boss of the cover to the exterior and on this exterior portion the boss of a cranked handle is mounted, which handle moves in the zone between the surfaces disposed at a dihedral angle.

According to another feature of the invention, in addition to fastening the conduit ends to the control fitting by inter-engaging projections or keys and notches, this method of connection may be used in couplings for connecting sections of guiding conduits together, especially where such conduits are of square section.

Such a coupling comprises a channel member having a section to fit over or saddle the aligned abutting or adjacent ends of the conduits to be coupled. Towards each end the channel on the interior has a suitably shaped integral key which projects inwardly. Each of the conduits to be coupled also has a gap or recess towards the end. The arrangement is such that when the two ends of the conduits are juxtaposed, then upon being saddled by the channel member the two keys of the latter enter the gaps or recesses of the conduit ends to hold the actual ends in the suitable juxtaposed position. To maintain the parts in position there is provided a cover which is fitted over the channel member to make contact with the conduit surfaces not covered thereby. Suitable means are provided to hold this cover in position and these means in some cases may consist of inter-engaging projections and recesses between the cover and the channel member.

According to a further feature of the invention, to increase the utility of controls according to the invention means are provided for interconnecting two cables in such manner that the one which is operated by the control fitting is enabled to impart its movements to the other.

For this purpose such means includes two guideways for the two cables, which cables run more or less parallel side by side, at least one of such two guideways including curved portions to open into the other in a tangential manner, to bring in this opened or gapped position the helical projections of one cable into meshing engagement with the helical projections of the other cable. By this means, axial movements given to one cable are imparted to the other cable.

In order that the invention may be better understood, it will now be described with reference to the accompanying somewhat diagrammatic drawings which are given by way of example only and in which:

Fig. 1 is a diagrammatic perspective view of a cable control fitting in accordance with the invention, located in position and controlling a main cable and subordinate cable for the simultaneous operation of two windows.

Fig. 2 is a front elevation of the fitting.

Fig. 3 is a sectional plan of Fig. 2.

Fig. 4 is an elevation of the base of said fitting.

Fig. 5 is a similar view of the cover thereof.

Fig. 6 is a section on the line VI—VI, Fig. 5.

Fig. 7 is a perspective view of an assembly of parts comprised by a conduit coupling means according to the invention.

Fig. 8 is a section, to a larger scale, of the assembled coupling.

Fig. 9 is a front elevation, with the cover removed, of a cable connector.

Fig. 10 is a fragmentary view of a portion of one of the members shown in Fig. 9, and Fig. 11 is a section through the middle portion of Fig. 9 to a larger scale and with the cover in position.

In the particular method of carrying the invention into effect shown in Figs. 1 to 6 of the drawing, the fitting is of symmetrical form both longitudinally and laterally. Moreover, it has the greatest depth at the centre, which diminishes in a regular maner towards the two ends.

The fitting comprises a base 12, the interior of which is shown in Fig. 4, which has two flat rear exterior surfaces 13 and 14 in planes mutually at right angles, to fit, as shown in Figs. 1 and 3, in a right-angled angular position between two surfaces 15 and 16. On the interior it has two surfaces 17 and 18, also mutually at right angles, parallel to the outer surfaces 13 and 14 to leave walls of desired thickness extending from end to end, one of which has countersunk holes 19 for the attaching screws by which the fitting is mounted in position, for example on the surface 15.

In an intermediate position between its ends, the base 12 on the interior has an integral boss 20 with a bore 21 in which is fixedly mounted a spindle 22 the axis of which projects forwardly to bisect the dihedral angle between the surfaces 13 and 14 and to come at right angles to what may be regarded as the vertical axis of the fitting. The cover also has small tapped bosses 23 to receive screws for the attachment of the cover to be hereafter described.

The cover (the interior of which is shown in Fig. 5) has a similar outline to the base and is co-extensive therewith both longitudinally and laterally. In its central position and coaxial with the bore 21, it has an outwardly extending apertured boss 24 to receive the stepped portion 25 of the boss 26 of a cranked handle 27 mounted to turn on the outer end of the spindle 22 by a screw the stem 28 of which engages in a groove 29 in the spindle to prevent the handle from being removed from the spindle but permitting it to be rotated freely thereon.

The cover comprises a flat plane surface 30 extending from end to end, which contacts with and fits on the flat surface 17 of the base. It also comprises another flat plane surface 31 extending from end to end, which fits on the flat surface 18 of the base, and further comprises two grooves or channels 32 and 33 in its substance, bounded on the exterior by surface 34 and 35 which come in the same plane as the surface 31 so that these surfaces 34 and 35 also fit on the surface 18 of the base.

The grooves or channels 32 define a guideway for that portion of the cable which passes through the fitting so that the intermediate portion thereof is brought to one side of the boss 20 of the base where it is held in meshing engagement with the teeth of a suitable worm-wheel 36 mounted to turn on the spindle 22 and the teeth of which engage with the helical projections on the cable in the usual manner. This wheel is connected by a spring torque coupling 37 of any usual form with the handle 27 so that upon rotation of the handle in either direction the wheel is moved in the same direction.

The cover is attached to the base by countersunk screws 38 which pass through the front of the cover to screw in the tapped holes in the small bosses 23 of the base.

The conduits for the fitting shown in the drawing are of square section and each end of the base and of the cover is shaped to take two sides of the conduit. For this purpose the base has recessed stepped portions 39 on the two surfaces 17 and 18 terminating in steps 40 against which latter the ends of the conduits abut. The conduit ends are similar to that shown in the upper part of Fig. 7 where the conduit 41 has notches 42 in two diagonally disposed edges at a desired distance from the actual end of the conduit. Each recessed end 39 of the base 12 has a key or projection 43 to engage a notch 42 so that when the cover, which has similar stepped recesses 44 at its ends, is located in position, the two conduits, one at the top and one at the bottom, are held firmly attached to the fitting.

Fig. 1 shows a diagram of the arrangement, where 45 is the fitting located in position with a lower conduit portion 46 fitting snugly into the angular corner between the surfaces 15 and 16, and an upper conduit portion 47 similarly disposed. It will be appreciated that this method of mounting the fitting and disposing the conduit portions is extremely neat and convenient.

As will be appreciated, the cable with the helical projection on the exterior could be utilised to operate any suitable device from the control fitting 45, for example for the opening and closing of a single window. In Fig. 1, however, it is shown in association with two windows, one of which is operated by the cable passing from the fitting 45 whilst the other is operated through a cable intermeshing with the first-mentioned cable.

For this purpose the conduit 48 in which the main cable 49 extending from the fitting 45 is caused to slide and which is connected to the window 50, is associated with another conduit 51 in which an auxiliary cable is caused to slide. The two cables are interconnected by a cable connector 52 diagramamtically indicated in Fig. 1 and shown in detail in Figs. 9, 10 and 11. It comprises an elongated rectangular covered casing 53, the cover being attached by screws 54. The casing 53 has two channeled guideways 55 and 56 for the cables which are parallel and spaced apart by dividing partitions 57 towards the ends of the casing, but which in the central position curve together and intersect to a desired degree.

In one guideway 55 to which the guiding conduits 47 and 48 are connected, the cable 49 is caused to slide. In the other guideway 56 is mounted the auxiliary cable 58; this slides in the conduit 51 and is connected to the window 59.

The degree of intersection of the channels 55 and 56 at the central part of the casing is such that the projecting helices 60 of the cable 49 intermesh with the projecting helices 61 of the auxiliary cable 58. As a result, when the cable 49 is moved from the control fitting 45, it imparts to the auxiliary cable 58 a similar movement in the same direction. In consequence, both windows 50 and 59 are simultaneously operated. The connector casing 53 is attached in position by screws passing through countersunk apertures 62, one at each end of the casing. These ends are, as shown in Fig. 10, recessed and stepped at 63 to receive the ends of two guiding conduits which are in contact.

The various lengths of guiding conduit, especially where of square section, are connected by couplings such as shown in Figs. 7 and 8. In Fig. 7, the upper conduit 41 is notched at 42 as already explained. Similarly, the lower conduit 64 is notched in diametrically opposite positions at 65 (only one of the notches showing). The actual coupling member 66 is of channel section to fit over two parallel sides of a conduit and to make contact with the side included between these parallel sides. In the channel, towards one end, there is a key or projection 67 (similar to the key or projection 43, Fig. 4) at one angular corner, and at the other angular corner indicated by the reference numeral 68, there is a similar key which, however, is not shown. The notches 42 and 65 are cut in the conduit portions 41 and 64 so that when these portions are juxtaposed in contact, then the coupling can be engaged therewith so that its two keys or projections engage one with a notch in one conduit portion 41 and the other with a notch in the other conduit portion 64. The parts are held in engagement by a sliding cover 69 on the conduits which passes on the exterior of two sides of the channel member and which has bent round ends 70 (Fig. 8) to engage the stepped base 71 of the channel. Preferably, this cover 69 is of a springy nature and remains in position as set. However, in some cases, screw or other means may be provided for fastening it in position.

Not only does the coupling member 68 act to couple the sections of the guiding conduit together, but it may also act as the means for securing them in position. For this purpose it is provided with a countersunk screw hole 72 by which it is mounted in position. Couplings of this nature are indicated by 73 in Fig. 1. In some cases the coupling may have the walls of its channel sufficiently spaced apart to engage with two touching conduits to secure them together and/or to another conduit section or sections. Such a double coupling is indicated by 74 in Fig. 1.

Although in the form of the fitting shown in Figs. 1 to 6 the dihedral angle between the two surfaces at the rear is a right angle, it could be less or more. Further, in place of the surfaces actually being plane surfaces, it is desired that the term should cover curved concave-like formations. In this case the base will not have two surfaces coming at an angle but a surface to correspond with the section of the concave channel.

The invention is claimed as follows:

1. A mechanical remote control fitting for a multi-stranded flexible cable having spaced helical projections on the exterior and adapted to be reciprocated in a guiding conduit, said fitting including a two-part casing, a spindle including a toothed wheel mounted within the casing for meshing with the helical turns of a portion of the cable which passes through the fitting and for operative connection with a handle exterior to the casing for moving the cable in the conduit, said fitting being characterised by the fact that the casing comprises a base and a co-extensive cover attached thereto, the base having rear surfaces disposed at an angle one to the other, to fit a dihedral angle into which the fitting is to be mounted, and by the further fact that the axis of the spindle is located in a plane which bisects said dihedral angle.

2. A mechanical remote control fitting as claimed in claim 1, in which the axes of the inlet and outlet for the cable are axially aligned and located in the plane which bisects the dihedral angle.

3. A mechanical remote control fitting as claimed in claim 1, in which the cover has guiding channels for the cable on the interior to lead and hold said cable in meshing engagement with the handle-operated toothed wheel.

4. A mechanical remote control fitting as claimed in claim 1, in which the fitting is of symmetrical form, both longitudinally and laterally, about the center of rotation of the spindle, with its greatest width and depth at the center which diminish in a regular manner towards the two ends, each of which latter has an opening for the attachment of the end of the guiding conduit and the passage of the cable, these openings being bounded in part by the base and in part by the cover.

5. A mechanical remote control fitting as claimed in claim 1, in which the base, on the interior, has plane surfaces parallel to its outer surfaces, and in which the co-extensive cover has plane bounding surfaces which contact the interior plane surfaces of the base when the parts are secured together.

6. A mechanical remote control fitting as claimed in claim 4, in which the fitting has projections in the openings at the ends, adapted to engage notches in the conduits to secure the fitting to the conduits when the cover is attached in position.

7. A remote control for movable workpieces such as windows and the like comprising a fitting as claimed in claim 1, a plurality of aligned guiding conduit sections associated with said fitting, and a coupling interconnecting a pair of adjacent guiding conduit sections, said coupling being of channel form and comprising projections at each end engaging notches in the adjacent sections, the coupling having an associated cover for securing in position over the joint between the conduit sections, and means by which it can be secured in position.

8. A remote control for movable workpieces such as windows and the like comprising a fitting as claimed in claim 1, a main cable meshing with the toothed wheel of the fitting, an auxiliary cable, a connector connecting said main and auxiliary cables and comprising guideways at least one of which includes curved portions to open into the other in a tangential manner to bring, in this opened or gapped position, the helical projections of the main cable into meshing engagement with the helical projections of the auxiliary cable.

References Cited in the file of this patent

UNITED STATES PATENTS

| | | |
|---|---|---|
| 1,983,962 | Barber et al. | Dec. 11, 1934 |
| 2,599,760 | Hanson et al. | June 10, 1952 |
| 2,652,245 | Bentley | Sept. 15, 1953 |
| 2,782,510 | Kramm | Feb. 26, 1957 |
| 2,833,537 | Hauch | May 6, 1958 |